(12) United States Patent
Segre et al.

(10) Patent No.: US 8,601,569 B2
(45) Date of Patent: Dec. 3, 2013

(54) SECURE ACCESS TO A PRIVATE NETWORK THROUGH A PUBLIC WIRELESS NETWORK

(75) Inventors: Marc Segre, Raleigh, NC (US); Andrew Paul Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/757,199

(22) Filed: Apr. 9, 2010

(65) Prior Publication Data

US 2011/0252230 A1   Oct. 13, 2011

(51) Int. Cl.
*G06F 9/00* (2006.01)
(52) U.S. Cl.
USPC .......................................... 726/15
(58) Field of Classification Search
USPC .......................................... 726/15
See application file for complete search history.

(56) References Cited

U.S. PATENT DOCUMENTS

| | | | |
|---|---|---|---|
| 6,081,900 A * | 6/2000 | Subramaniam et al. | 726/19 |
| 6,571,289 B1 | 5/2003 | Montenegro | |
| 7,117,526 B1 | 10/2006 | Short | |
| 7,159,242 B2 | 1/2007 | Genty et al. | |
| 7,774,828 B2 * | 8/2010 | Benenati et al. | 726/5 |
| 2002/0023210 A1 * | 2/2002 | Tuomenoksa et al. | 713/161 |
| 2004/0037260 A1 * | 2/2004 | Kakemizu et al. | 370/338 |
| 2004/0081173 A1 * | 4/2004 | Feather | 370/395.54 |
| 2004/0148430 A1 | 7/2004 | Narayanan | |
| 2004/0225895 A1 | 11/2004 | Mukherjee et al. | |
| 2005/0102525 A1 * | 5/2005 | Akimoto | 713/187 |
| 2006/0288406 A1 * | 12/2006 | Kuhn et al. | 726/8 |
| 2008/0022392 A1 | 1/2008 | Karpati et al. | |
| 2008/0098484 A1 * | 4/2008 | Cicchitto et al. | 726/27 |

OTHER PUBLICATIONS

Simon et al., "EAP-TLS Authentication Protocol", Proposed Standard, Network Working Group RFC 5216, Mar. 2008.

* cited by examiner

*Primary Examiner* — Teshome Hailu
(74) *Attorney, Agent, or Firm* — Patents on Demand P.A.; Brian K. Buchheit; Scott M. Garrett

(57) ABSTRACT

A system, method and computer-program product for a client device to securely access a private network through a public wireless network. The system establishes a first network tunnel between the client device and a gateway of the public wireless network and then authenticates the client device with an authentication server of the private network using the first tunnel. The authentication is proxied by an authentication server of the public network. Once the authentication is successful, a second tunnel is established between the client device and a gateway of the private network for secure access by the client device to the private network.

23 Claims, 8 Drawing Sheets

SECURE ACCESS TO A PRIVATE NETWORK THROUGH A PUBLIC WIRELESS NETWORK

FIELD OF THE INVENTION

The invention relates generally to computer networks, and more particularly, to a method and system for securely accessing an enterprise private network through a public or third-party wireless network.

BACKGROUND

Communication networks might either be private or public. In a private network, communications between multiple computers occur in a secure environment that prevents access from outside the network without appropriate authentication. These networks are considered as "trusted" networks because the communication signals securely travel from one computer to another within the private network without being exposed to the external environment.

Public networks such as the Internet, on the other hand, are not secure because the communication over these networks is not private and is susceptible to interception by other computers. In addition, the public networks cannot guarantee the delivery of the data packets being sent. They allow packets to be injected into, or ejected out of, the networks indiscriminately, and analyzed while in transit. To keep data sent over a public network private, a Virtual Private Network (VPN) is commonly established on top of a public network when two computers use the public network to communicate with each other. In a Virtual Private Network, data sent from one computer to another is encrypted by a security gateway and transmitted in encrypted form over the public network to a second security gateway connected to the receiving computer. The second gateway decrypts the data before forwarding it to the receiving computer. Such a private channel established on top of another network is referred to as a network tunnel.

In order to set up a Virtual Private Network, a user first establishes a path to a VPN server and goes through an AAA process (Authentication, Authorization and Accounting) for identification and authorization to create a secure tunnel with the server. Once the user is authorized, a secure network tunnel is established between the user and the VPN server over the public network, using a VPN protocol such as IPsec. This process requires a VPN client on the user's side, a VPN server and other VPN hardware on the other side of the tunnel, as well as appropriate user configurations.

Today's private networks often include wireless networks such as WiMAX to accommodate mobile access. In addition, to provide mobility access in a large geographic area, a private enterprise often relies on third-party wireless infrastructures besides its own wireless network. In this case, a user's device would need to be authenticated by both a third-party gateway and an enterprise authentication server before it could access the enterprise network. User credentials are typically requested by and securely returned to the third-party gateway. Once the user is authenticated and authorized, the user may communicate with the third-party wireless gateway.

The user, however, still needs a secure connection between the user's device and an enterprise VPN server in order to access the enterprise's private network when going through a public network. As a result, in an environment that includes a third-party wireless carrier network, the user must be authenticated and authorized by both the public gateway and the enterprise's authentication server in order to access a private enterprise network.

Therefore, there is still a need for an improved system and method for securely communicating with a private network through a public or third-party wireless network without the aforementioned drawbacks.

SUMMARY

The invention relates to a computer network system, method and computer-program product for securely accessing an enterprise's private network through a public or third-party carrier wireless network. The network system includes a public gateway for establishing a first network tunnel between the client device and the gateway once the client device is authenticated by an authentication server of the public network. This authentication server then acts as a proxy for authenticating the client device to an authentication server of the private network using the first tunnel. Once the client is successfully authenticated to the authentication server of the private network, a second network tunnel is established between the client device and the private network to allow secure client access.

In the exemplary embodiments of the invention, the network tunnels are established using a challenge-response authentication protocol such as the Extensible Authentication Protocol-Transport Layer Security (EAP-TLS). The authentication includes an exchange between the client and the server on the security credentials of a client user and public-private encryption key pairs. Data packets associated with the authentication of the client device with the private authentication server are encrypted and forwarded unchanged to the private authentication server by the public gateway. The public wireless network in the exemplary embodiments of the invention is a WiMAX wireless network.

In another embodiment of the invention, a method is described for a client device to securely access a private network through a public wireless network. The method comprises establishing a first tunnel to a gateway of the public wireless network connected to the private network, and authenticating the client device with an authentication server of the private network using the first tunnel where the authentication server is connected to a gateway of the private network. Once the authentication is successful, a second tunnel is established between the client and the private gateway to allow secure access to the private network.

In yet another embodiment of the invention, a computer program product is described for a client device to securely access a private network through a public wireless network. The product comprises a computer usable storage medium having readable program code embodied in the storage medium. The program code establishes a first tunnel to a gateway of the public wireless network that is connected to the private network, authenticates the client device with an authentication server of the private network using the first tunnel, and establishes a second tunnel between the client device and the private network gateway to allow secure client access to the private network.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
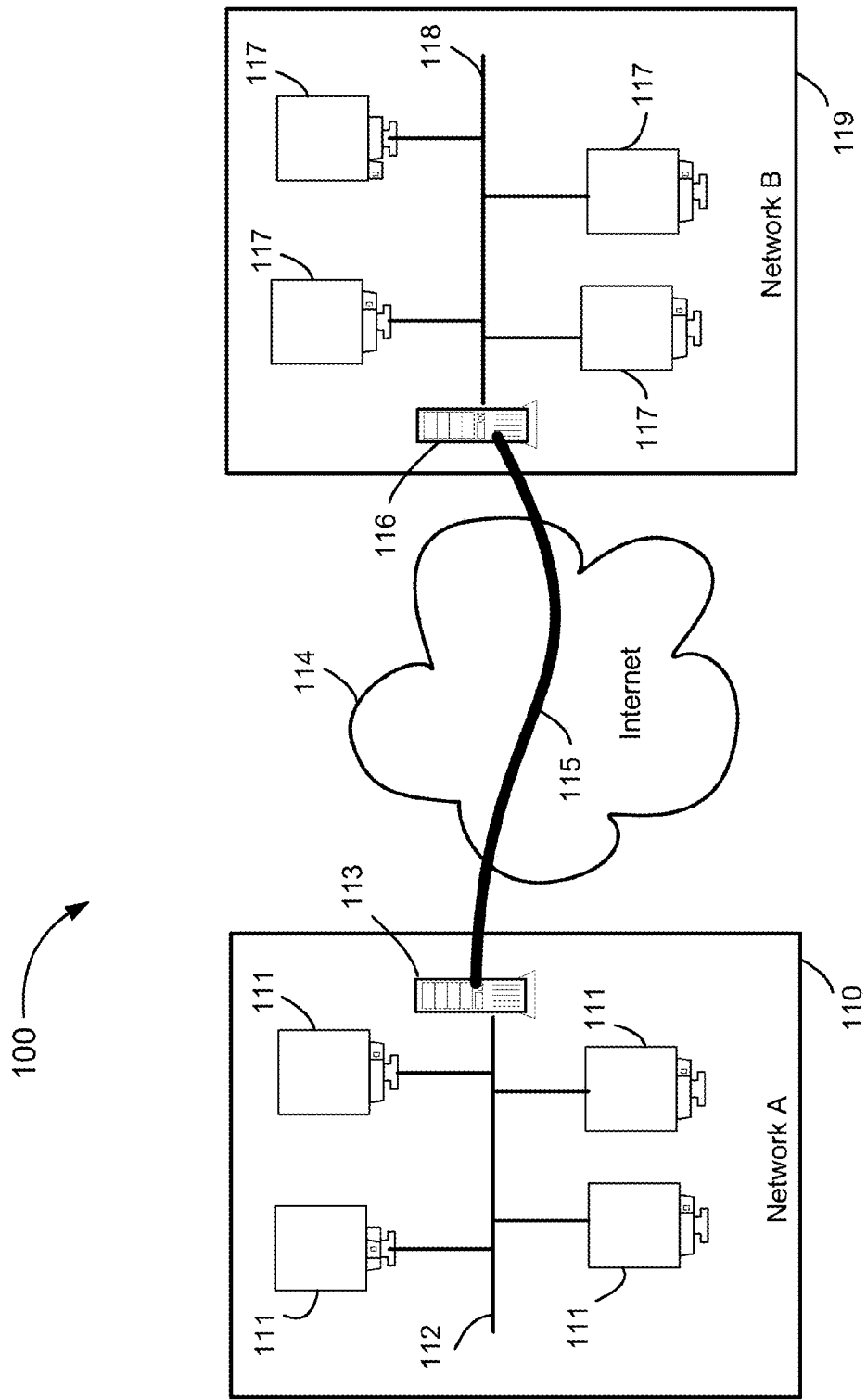
FIG. 1 is a block diagram illustrating a typical secure network tunnel established between two networks through the Internet.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention relates to secure and remote client access of an enterprise's private network where the client authentication to the private network is proxied by a public or third-party wireless network. More particularly, the client authentication to the private network is performed by a public authentication server through a secure network tunnel established over the public or third-party wireless network. Although exemplary embodiments of the invention are not limited to public or third-party wireless networks, they leverage the architecture used in many wireless networks, in particular, WiMAX networks, for authenticating the client. Both the Authentication, Authorization and Accounting (AAA) process and the management of the secure tunnel to a private gateway of the enterprise are proxied by the public authentication server and gateway in the public network.

Secure remote wireless access is accomplished without requiring a VPN server, VPN client or VPN hardware. This saves equipment and support expenses for the enterprise and provides seamless connectivity for the user. Roaming between the enterprise's wireless network and public networks happens automatically without any user intervention such as starting the VPN client. In addition to the reduced infrastructure, the enterprise also eliminates expenses associated with the maintenance and management of a VPN server.

Refer now to FIG. 1 which illustrates a typical Virtual Private Network 100 established over the public Internet 114. The Virtual Private Network 100 includes a secure network tunnel 115 between trusted networks 110 and 119. The trusted network 110 includes multiple computers 111 connected to each other by network 112. The trusted network 119 includes multiple computers 117 connected to each other by network 118. The networks 112 and 118 are typically local area networks (LANs), such as Ethernet networks, and connected to the public Internet through security gateways 113 and 116, respectively.

The network tunnel 115 between the two networks 110 and 119 is established on top of the underlying Internet 114. Data traveling over the tunnel 115 is not visible to and is encapsulated from traffic of the Internet 114. The traffic within the tunnel 115 appears to the Internet 114 as just another traffic stream to be passed. In addition, the data packets that carry the payload between the two networks 110 and 119 are encapsulated within the packets of the Internet protocol, with additional packet identification and security information.

Figure 2:
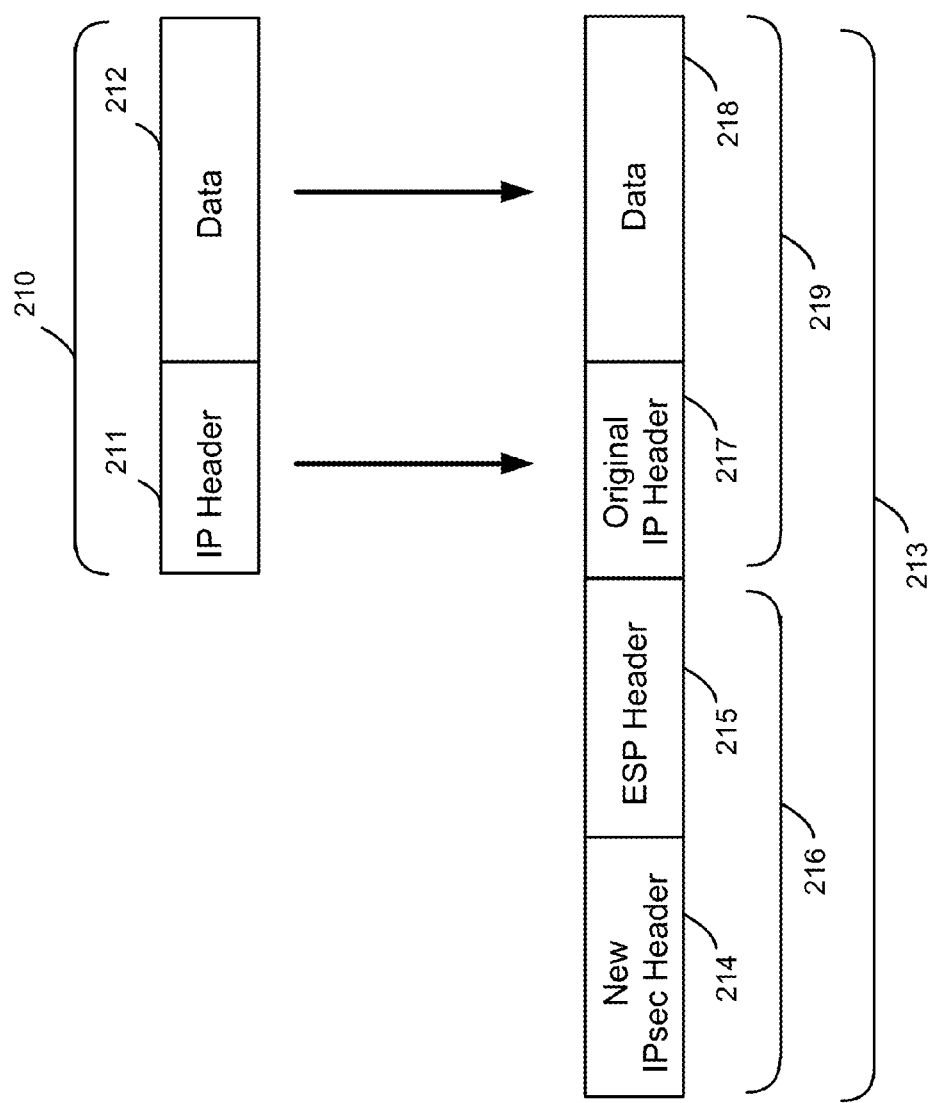
FIG. 2 is a block diagram showing an example of an encapsulated data packet for transmission through a secure network tunnel.

FIG. 2 illustrates an example of the data packets sent over an IPsec-based VPN tunnel such as the tunnel 115. A data packet 210 may originate from a host 111 or 117 to other computers in the network. The data packet 210 includes an IP header 211 and a data field 212. The IP header 211 typically contains a data type, a packet number, the total number of packets being transmitted, and the IP addresses of the sender and receiver. To keep the contents of the IP header 211 and data field 212 private to the sender and receiver, these fields are included in a larger data packet 213 when they are sent over the Internet.

The data packet 213 includes a new IP header 214 and an Encapsulating Security Payload (ESP) header 215. The new IP header 214 and the ESP header 215 are referred to as the Outer IP header (216). The original IP header 211 and data field 218 are referred to as the Inner IP header (219) of the packet 213. For additional security protection, the Inner IP header 219 and original data field 212 are generally encrypted by a sending node before transmission and then decrypted by a receiving node.

Figure 3:
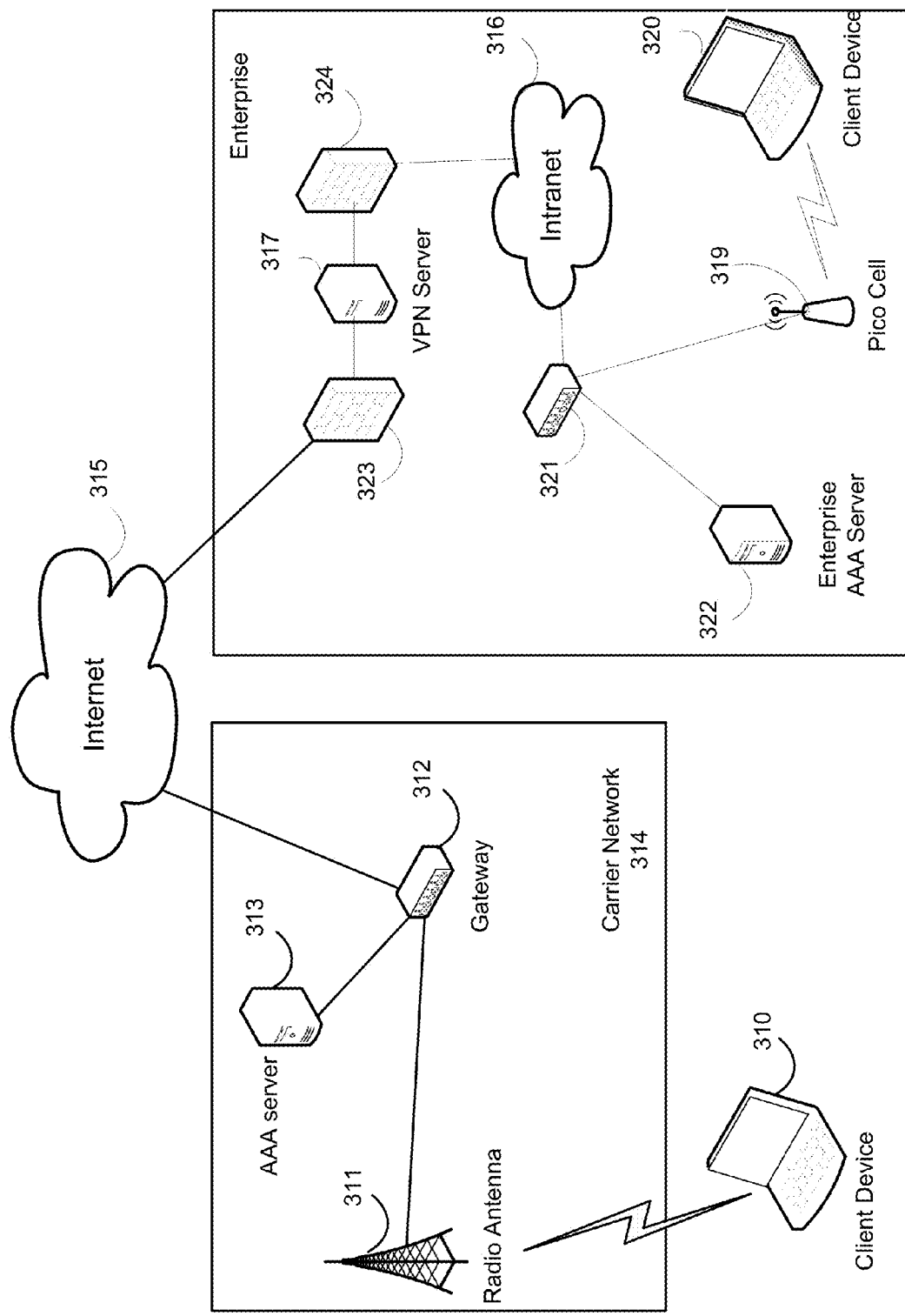
FIG. 3 is a block diagram illustrating a network configuration to allow client devices to access a private network through a public wireless network using a VPN sever and security firewalls.

FIG. 3 shows an example of a network configuration for allowing mobile users and client devices to access a private intranet through a carrier wireless network and the Internet using a VPN sever. A wireless network such as carrier network 314 transmits data over the air. The transmitted data can be received by anyone within the range of a radio-frequency (RF) signal. A client device 310 might be a portable computer or communications device with integrated 802.1X radio and support for data encryption and client authentication. The client device 310 communicates with a gateway 312 of a carrier or public wireless network 314 through a radio antenna 311. The carrier or public wireless network 314 might be a WiMAX radio network. The client device 310 typically needs to be authenticated and authorized by an authentication (AAA) server 313 of the public network 314 when the client device 310 is first connected to the gateway 312.

To protect the data transmitted over the public or carrier network 314 from unauthorized users, most wireless technologies (including WiMAX) authenticate users and employ secure tunnels to exchange data between end user devices and a private network. The tunnels are either terminated at an access point of the wireless network or a common gateway, like the gateway 312, that all the access points communicate with. WiMAX and other wireless networks generally use a challenge-response protocol such as the Extensible Authentication Protocol (EAP) to authenticate users. End user credentials are requested and securely returned to the wireless gateway 312 which verifies if the user is authorized to use the public wireless network 314. One way for authenticating a user is to forward client credentials to the authentication server 313, e.g., a RADIUS server or a DIAMETER server. Once the user is authenticated and authorized, a secure tunnel is established from the user device 310 to the wireless network 314 or gateway 312 to allow data to be securely exchanged over the public wireless network 314.

If the wireless network 314 is within the enterprise, then the client device 310 could start accessing the enterprise's private network 316. However, this is often not the case as the wireless network 314 is typically operated by a third-party carrier to provide access to the Internet 315. The enterprise's private network 316 is also connected to the Internet 315 to allow a wider remote access coverage. As a result, the enterprise typically has a VPN server 317, which is accessible from the Internet 315, and requires the user's client device 310 to be authenticated and authorized by the VPN server 317 before it could access the enterprise network 316. If the client device 310 is authenticated and authorized, then another secure tunnel is established, this time from the end user's client device 310 to the enterprise's VPN server 317.

Also shown in FIG. 3 is a user's client device 320 on the enterprise's premise that accesses the enterprise private network 316 via an on-campus wireless network. The on-campus wireless network includes a radio antenna 319 through which client device 320 is connected to a wireless gateway 321. The wireless gateway 321 is connected to an enterprise authentication server 322 and the enterprise private network 316. The enterprise authentication server 322 handles the authentication and authorization of the client device 320 when it first accesses the enterprise's on-campus wireless network. The network configuration in FIG. 3 demonstrates one of the strengths of WiMAX in terms of its ability to deliver both carrier wireless services via a macro network (e.g., network 314) and private campus/in-building connectivity via a pico cell network.

Figure 4:
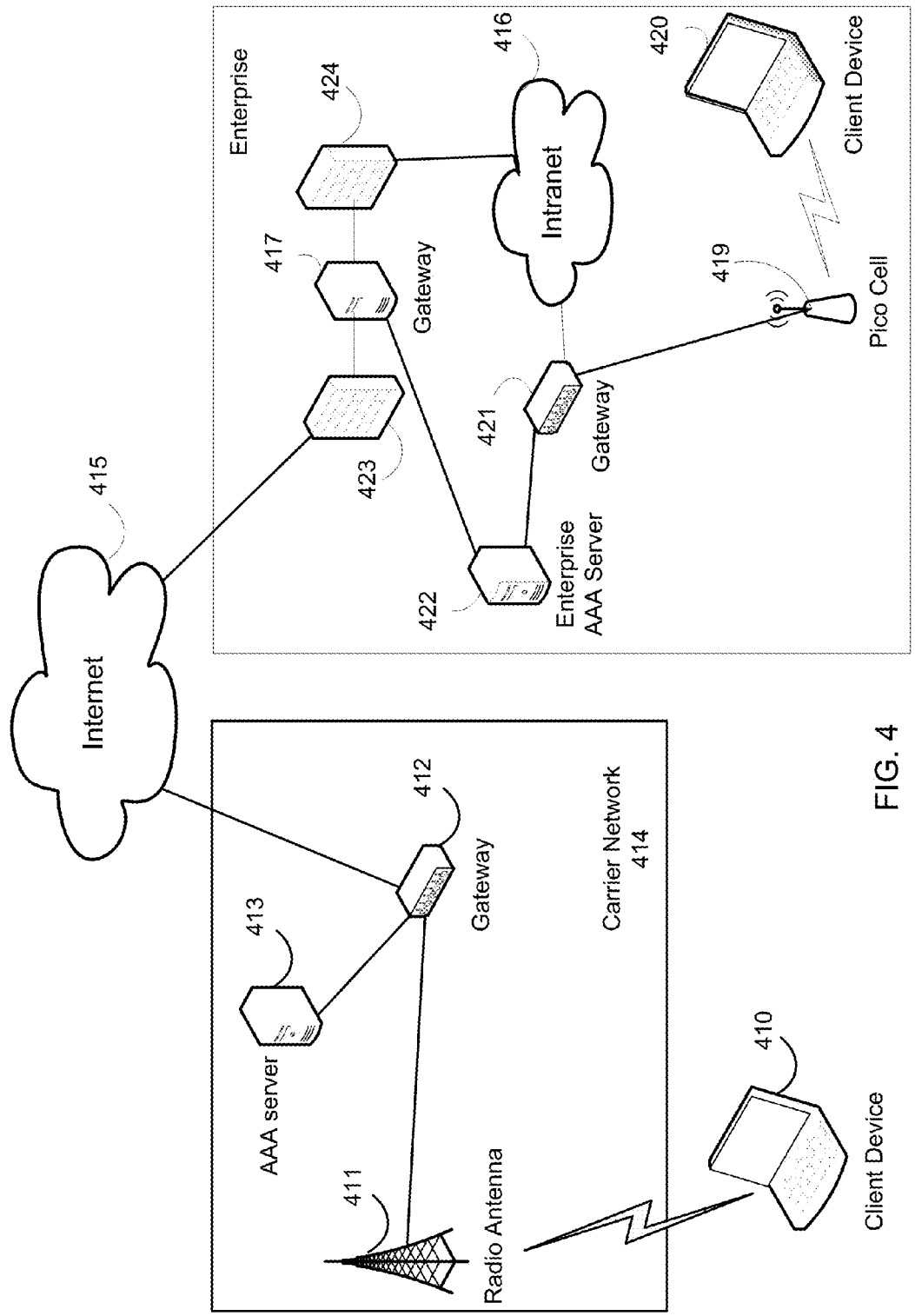
FIG. 4 is a block diagram illustrating an exemplary network arrangement to allow client devices to access a private network through a public wireless network in which client authentication is proxied by a public authentication server, according to aspects of the invention.

FIG. 4 shows a network configuration to allow client access to an enterprise's private network through a carrier or public wireless network, such as WiMAX, in accordance with the exemplary embodiments of the invention. A client device 410 communicates with a gateway 412 of a carrier or public wireless network 414 through a radio antenna 411. The client device 410 is authenticated and authorized by an authentication server 413 of the public network 414 when the client device 410 is first connected to the public gateway 412.

Once a network tunnel is established between the client device 410 and the public gateway 412, the public authentication server 413 acts as a proxy to allow the client device 410 to be authenticated and authorized for accessing the enterprise private network 416. The proxied client authentication is described in detail below with reference to FIGS. 5-8. As an example, the enterprise private intranet 416 is shown as being accessible from the public or carrier wireless network 414 through the Internet 415 and gateway 417 of the private intranet 416. Access to the private network 416 through the Internet 415 is further protected from unauthorized clients by firewalls 423 and 424.

FIG. 4 also shows an end-user client device 420 on the enterprise's premise that accesses the enterprise private network 416 via an on-campus wireless network. The on-campus wireless network includes a radio antenna 419 through which client device 420 is connected to a wireless gateway 421. The wireless gateway 421 is in turn connected to an enterprise authentication (AAA) server 422 and the enterprise private network 416. The enterprise authentication server 422 handles the authentication and authorization of the client device 420 as described below in reference to FIGS. 5-7.

Figure 5:
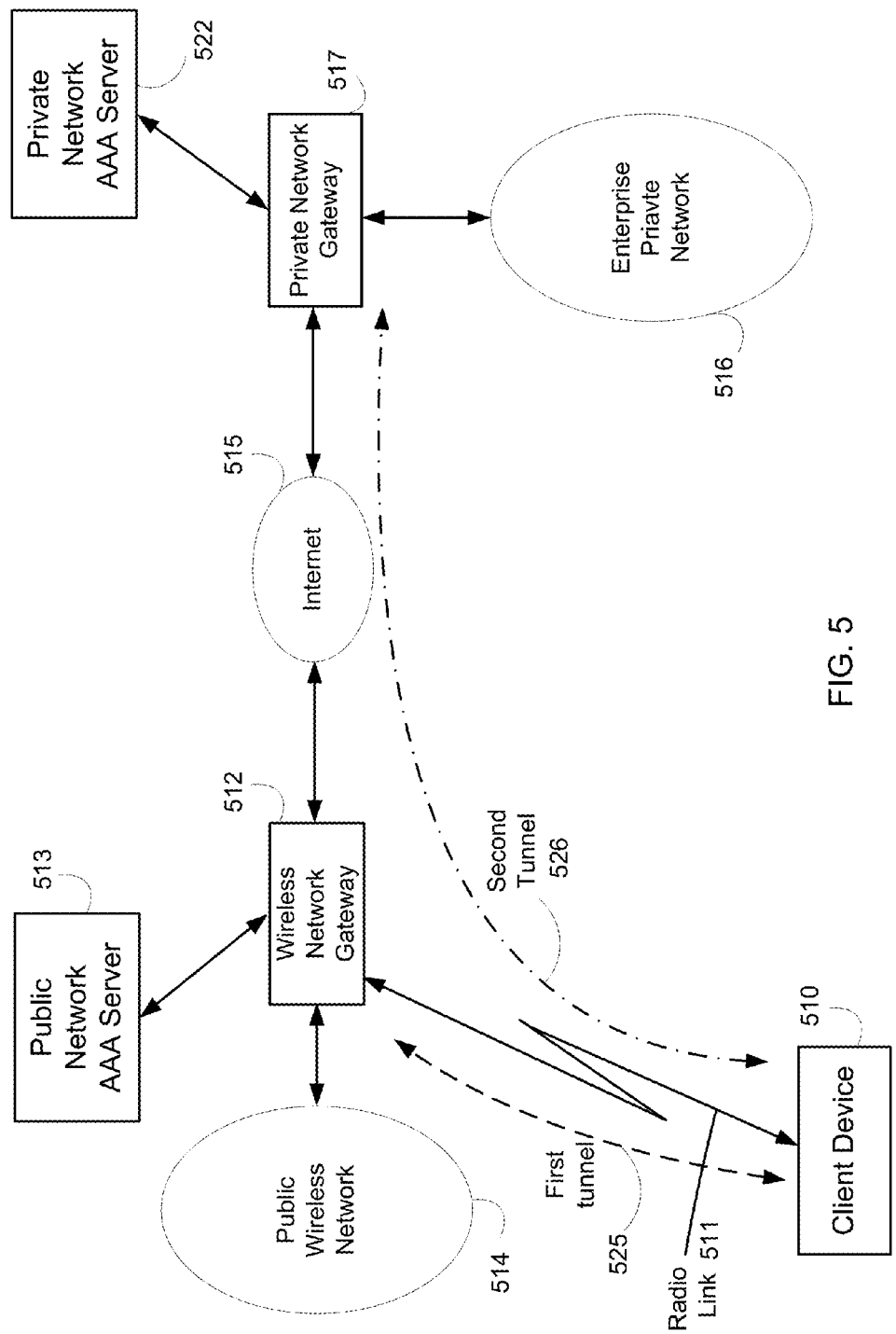
FIG. 5 illustrates the interactions among a client device, a gateway and an authentication server of a wireless public network, and a gateway and an authentication server of a private network, to provide secure client access to the private network, according to exemplary embodiments of the invention.

Refer now to FIG. 5 which illustrates a process for a client to access a private network, with the client authentication being proxied by an authentication server and gateway of a public wireless network, in accordance with the exemplary embodiments of the invention. The client device 510 accesses a public wireless network 514 through a wireless gateway 512 of the public network 514. The client 510 is connected to the gateway 512 through radio link 511 after being authenticated by an authentication (AAA) server 513 of the public network. Typically, end users credentials are requested from the client device 510 by the wireless gateway 512. The gateway 512 then verifies from the returned credentials whether the user is authorized to use the public wireless network 514. One way to verify a user is to forward client credentials to an authentication (AAA) server 513. Once the user is authenticated and authorized by the authentication server 513, a first network tunnel 525 is established from the user device 510 to the wireless gateway 512.

FIG. 5 further shows an enterprise's private network 516 connected to the public network 514 through the Internet 515 and private network gateway 517. Alternatively, the private network 516 may be connected to the public network 514 through other types of communication channels such as a leased telephone line or an optical fiber link.

Once the first network tunnel 525 is established, the authentication server 513 proxies a request to an authentication server 522 associated with the enterprise private network 516 to authenticate the client device 510 for access to the private network 516. In the exemplary embodiments of the invention, the client device 510 is authenticated using a challenge-response protocol such as the Extensible Authentication Protocol (EAP) described below. After the client device 510 is authenticated and authorized by the authentication server 522, a second network tunnel 526 is established between the client device 510 and the private network gateway 517 to allow the device 510 to securely access the private network 516. The authentication of the client device 510 by the authentication server 522 and the establishment of the second network tunnel 526 are described in detail with reference to FIGS. 6-7.

EAP Authentication

In the exemplary embodiments of the invention, a client authentication to a wireless network is based on an implementation of the Extensible Authentication Protocol (EAP). EAP is an authentication framework often used in wireless networks and point-to-point connections. Although the EAP framework is not limited to wireless networks and can be used for wired LAN authentication, it is more common in a wireless environment. The EAP framework provides port-based authentication, which involves communications between a supplicant (client), authenticator, and authentication server. The supplicant is often software on a client device, such as a laptop; the authenticator is a wired or wireless access point; and the authentication server is typically a host running software that supports the EAP implementation.

The authenticator acts like a security guard to a protected network. The supplicant (client device) is not allowed access through the authenticator to the protected side of the network until the supplicant's identity has been validated and authorized. In an authentication, the supplicant provides credentials, such as user name/password or digital certificate, to the authenticator, and the authenticator forwards the credentials to the authentication server for verification. If the credentials are verified as being valid in the authentication server's database, the supplicant (client device) is allowed to access resources located on the protected side of the network.

A typical authentication process consists of the following phases.

Initialization: On detection of the new client (supplicant), a port on the authenticator is enabled and set to the "unauthorized" state.

Initiation: To initiate the authentication, the authenticator periodically transmits an EAP-Request Identity frame to a designated address. The supplicant listens on this address, and on receipt of the EAP-Request Identity frame, it responds with an EAP-Response Identity frame that contains a supplicant identifier. The authenticator then encapsulates this Identity response and forwards it on to the authentication server. The supplicant may also initiate or restart authentication by sending an EAPOL-Start frame to the authenticator.

Negotiation: The authentication server sends a reply to the authenticator, containing an EAP Request specifying the EAP method it wishes the supplicant to perform. The authenticator encapsulates the EAP Request in an EAPOL frame and transmits it to the supplicant. The supplicant can respond with a different EAP method that it is willing to perform, or start the requested EAP method.

Authentication: If the authentication server and supplicant agree on an EAP method, EAP Requests and Responses are sent between the supplicant and the authentication server (translated by the authenticator) until the authentication server responds with either an EAP-Success message or an EAP-Failure message. If authentication is successful, the authenticator sets the port to the "authorized" state and normal traffic is allowed.

TLS alert message. If the peer authenticates successfully, then the EAP server responds with an EAP-Request packet with EAP-Type=EAP-TLS, which includes finished handshake messages. The peer then verifies the finished message by sending an EAP-Response packet of EAP-Type=EAP-TLS, and no data. The EAP Server responds with an EAP-Success message to conclude the authentication process.

TABLE 1

| Authenticating Peer | Authenticator |
|---|---|
|  | <- EAP-Request/Identity |
| EAP-Response/Identity (MyID) -> |  |
|  | <- EAP-Request/EAP-Type=EAP-TLS (TLS Start) |
| EAP-Response/EAP-Type=EAP-TLS (TLS client_hello)-> |  |
|  | <- EAP-Request/EAP-Type=EAP-TLS (TLS server_hello, TLS certificate, [TLS server_key_exchange,] TLS certificate_request, TLS server_hello_done) |
| EAP-Response/EAP-Type=EAP-TLS (TLS certificate, TLS client_key_exchange, TLS certificate_verify, TLS change_cipher_spec, TLS finished) -> |  |
|  | <- EAP-Request/EAP-Type=EAP-TLS (TLS change_cipher_spec, TLS finished) |
| EAP-Response/EAP-Type=EAP-TLS -> |  |
|  | <- EAP-Success |

In an exemplary embodiment of the invention, the EAP-Transport Layer Security (EAP-TLS) protocol is used for authenticating a wireless client device. The EAP-TLS provides strong security for secure communication to an authentication server, uses a client-side certificate in the authentication and is supported by most client operating systems.

During an EAP-TLS authentication, the network client initially verifies the identity of the authentication server by validating the server's TLS signature. The client and server will then derive a symmetric key to protect the next phase of the EAP authentication in which the identity of the client is validated by the server. The authentication server sends an EAP-Request/Identity packet to the client, and the client responds with an EAP-Response/Identity packet to the authenticator which contains the client's user-ID. Once the client's identity is received, the EAP server responds with an EAP-TLS/Start packet.

The EAP-TLS conversation will then begin, with the client sending an EAP-Response packet. The EAP server then responds with an EAP-Request packet that includes handshake, TLS certificate, server_key_exchange and certificate_request messages. This information is encapsulated in the EAP-Request packet. The certificate message contains a public key certificate chain for either a key exchange public key (such as an RSA or Diffie-Hellman key exchange public key) or a signature public key (such as an RSA or Digital Signature Standard signature public key).

A certificate_request message is included when the server desires the peer to authenticate itself via public key. If the peer supports EAP-TLS and is configured to use it, it responds to the EAP-Request with an EAP-Response packet of EAP-Type=EAP-TLS. The peer response contains a certificate for the peer's signature public key and the peer's signed authentication response to the EAP server. After receiving this packet, the EAP server will verify the peer's certificate and digital signature, if requested.

If the peer's authentication is unsuccessful, then the EAP server sends an EAP-Request packet with EAP-Type=EAP-TLS, encapsulating a TLS record containing the appropriate Table 1 is a summary of the exchange of the authentication messages between a peer (client device) and the authenticator when the EAP-TLS mutual authentication is successful.

Identity Verification

As part of the TLS negotiation, the server presents a certificate to the peer, and if mutual authentication is requested, the peer presents a certificate to the server. The EAP-TLS peer name (Peer-Id) represents the identity to be used for access control and accounting purposes. The Server-Id represents the identity of the EAP server. Together the Peer-Id and Server-Id identify the entities involved in deriving the public/private key pair. In the EAP-TLS protocol, the Peer-Id and Server-Id are determined from the peer and server certificates.

Certificate Validation

The EAP-TLS server is typically connected to the Internet and supports validating the peer certificate. Where the EAP-TLS server is unable to retrieve intermediate certificates, either it will need to be pre-configured with the necessary intermediate certificates to complete path validation or it will rely on the EAP-TLS peer to provide this information as part of the TLS handshake. Once a TLS session is established, EAP-TLS peer and server implementations validate that the identities represented in the certificate are appropriate and authorized for use with EAP-TLS. The authorization process makes use of the contents of the certificates as well as other contextual information. Authorization is based on the EAP-TLS Peer-Id and Server-Id.

Figure 6:
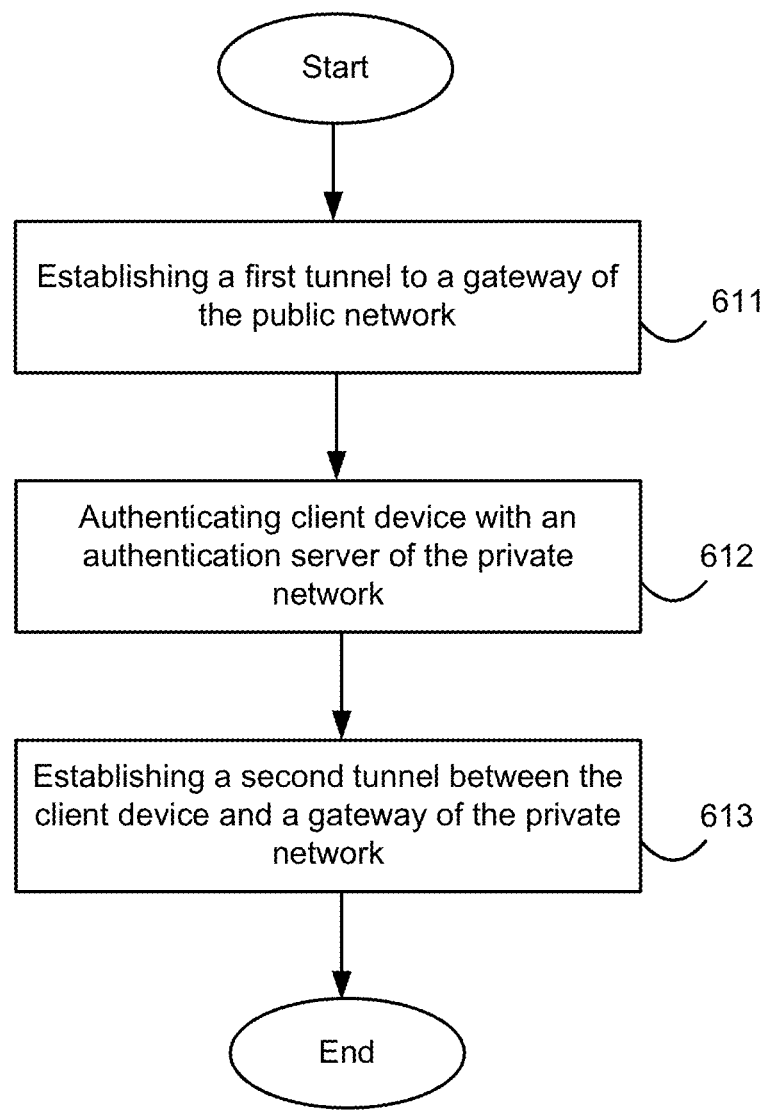
FIG. 6 is a flow chart of an exemplary process for a client device to be authenticated and to establish a secure network tunnel to a private network through a public wireless network, according to aspects of the invention.

FIG. 6 is a flow chart of an exemplary process for a client device to be authenticated before accessing a private network according to aspects of the invention. At block 611, a network tunnel is first established between the client device and a public or third-party carrier wireless network. The client device is then authenticated with an authentication server of the enterprise's private network using the first tunnel, at block 612. Once the client device is authenticated by the authentication server associated with the private network, a second network tunnel is set up between the client device and a gateway of the private network to allow the client to securely access the private network, at block 613.

Figure 7:
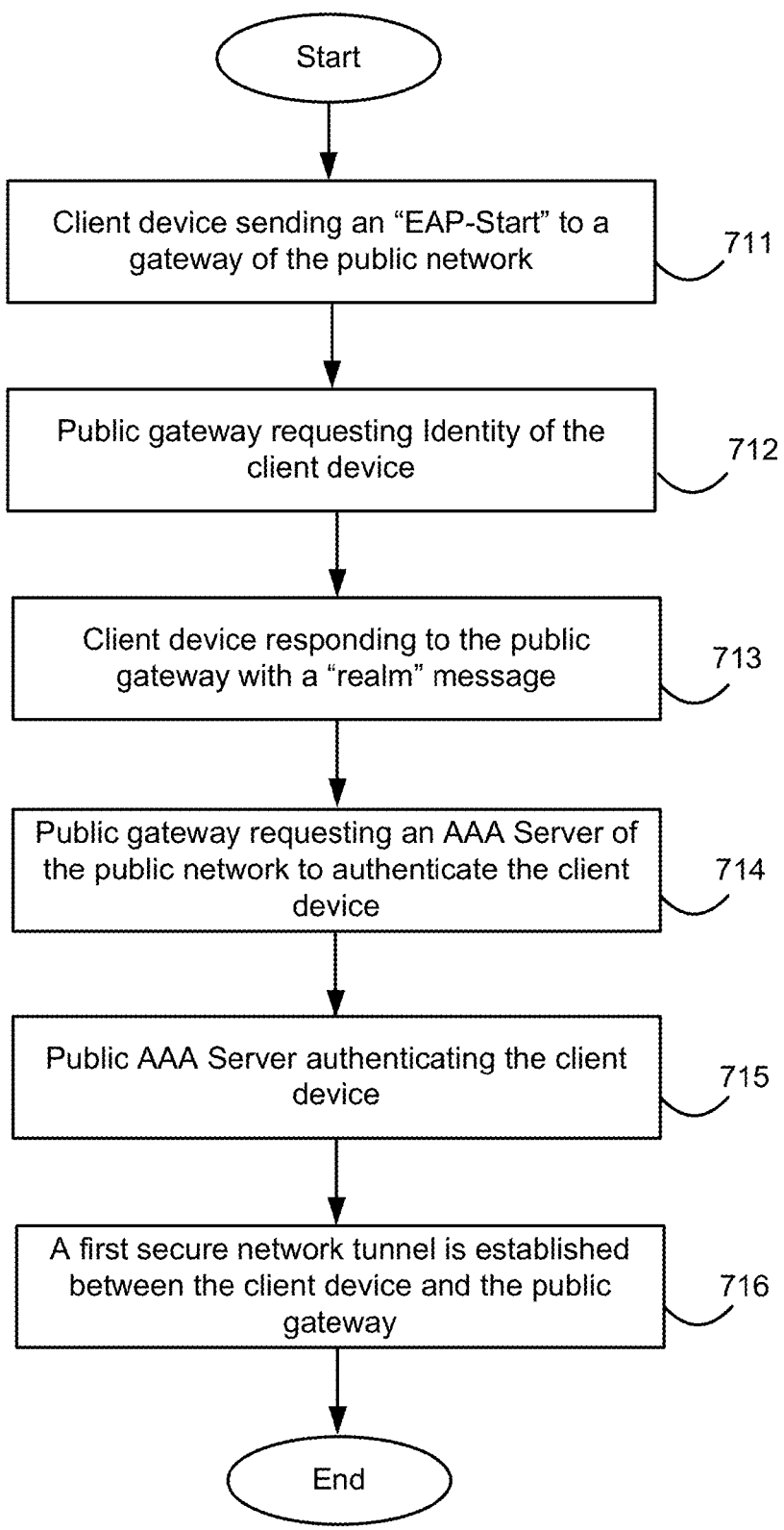
FIG. 7 is a flow chart of an exemplary process for a client device to be authenticated by a gateway and authentication server of a public wireless network to establish a first secure network tunnel, according to aspects of the invention.

FIG. 7 is a flow chart of an exemplary process for authenticating the client device by the authentication server of the public network and establishing the first network tunnel (from block 611). At block 722, the client device sends an "EAP-Start" to a gateway of the public or carrier wireless network. The public gateway then requests the client's identity information at block 712. The client device responds to the public gateway with a "realm" message that includes client identity data, at block 713. Once the client's identity has been verified by the public network gateway, the gateway contacts an authentication server connected to the public gateway and requests the authentication server to authenticate and authorize the client device, as shown in block 714. The authentication server of the public network performs a client authentication process such as the EAP authentication described above, at block 715. If the authentication is successful, a first secure network tunnel is set up between the client device and the gateway of the public wireless network, at block 716.

Figure 8:
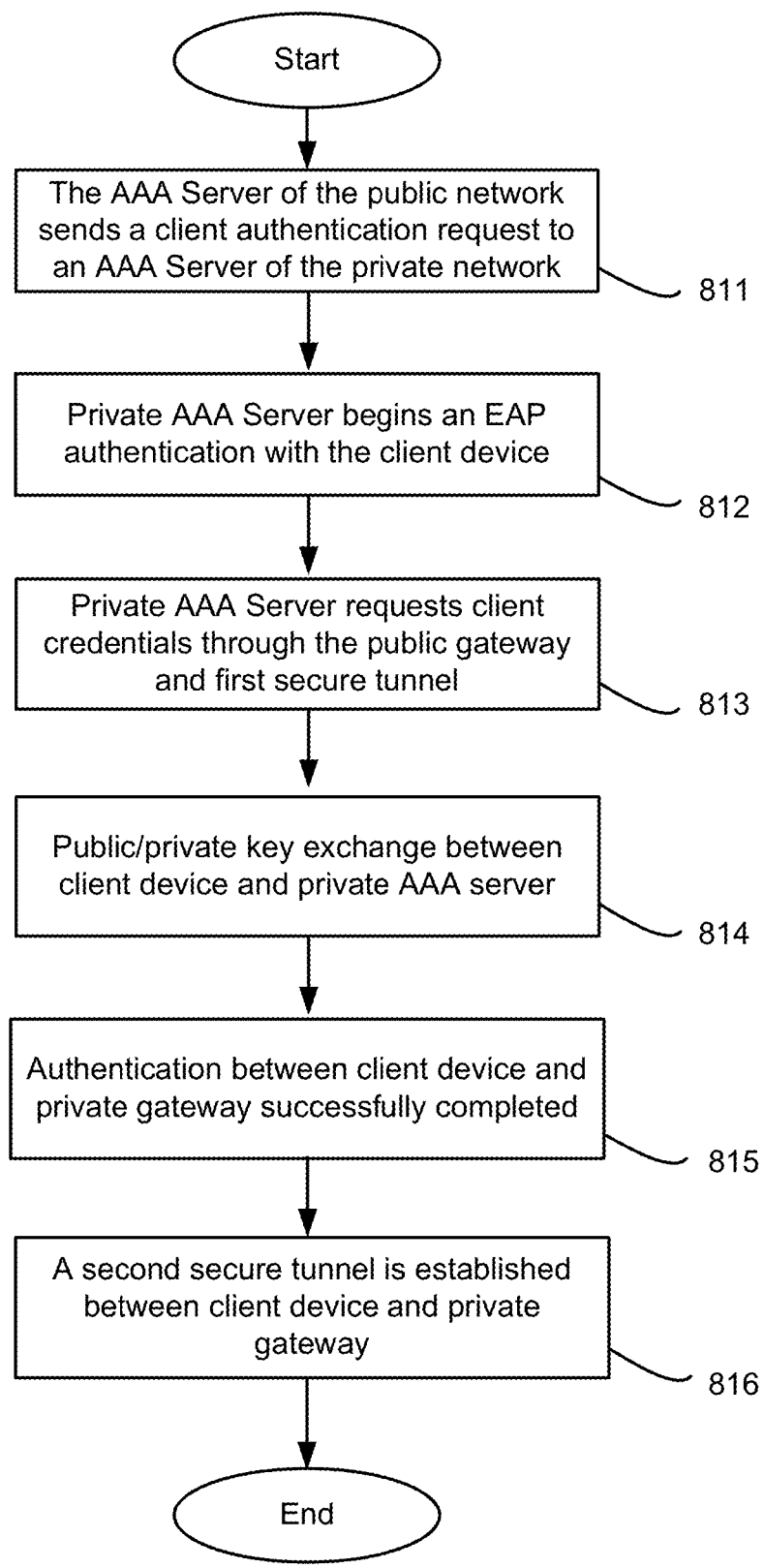
FIG. 8 is a is a flow chart of an exemplary process for a client device to be authenticated by a gateway and authentication server of a private network to establish a second secure network tunnel, according to aspects of the invention.

FIG. 8 shows a flow chart of an exemplary process for authenticating the client device with a private network using the first tunnel (from block 612) and establishing a second tunnel between the client and a private network gateway (from block 613). Once a first network tunnel is established between the client device and the public gateway, the authentication server of the public network sends a request to an authentication server of the private network to initiate a client authentication with the private network through the first tunnel, per block 811. The enterprise authentication server begins the authentication of the client device, preferably using an EAP process, per block 812.

As previously described, the EAP authentication includes a request for client security credentials from the client device (block 813) and an exchange of public/private keys between the client device and the private authentication server (block 814). The requests and responses concerning the credentials and public/private keys are proxied by the authentication server and gateway of the public network through the first network tunnel. Once the client device is successfully authenticated and authorized by the private authentication server at block 815, a second network tunnel is established between the client device and the private gateway, at block 816. The client device could now begin securely access the private network through the second tunnel.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A network system for a client device to securely access a private network through a public wireless network, comprising:
   a public gateway coupled to the public wireless network wherein the public wireless network is coupled to the private network;
   a public authentication server coupled to the public wireless network for authenticating the client device to the public network;
   a first network tunnel established between the client device and the public gateway, in response to a successful client device authentication to the public network;
   a private authentication server coupled to the private network for authenticating the client device to the private network in response to a successful authentication of the client device to the public wireless network, wherein the client device authentication to the private network is proxied by the public authentication server of the public wireless network and is performed over the first network tunnel; and
   a second network tunnel established between the client device and a private gateway coupled to the private network, in response to a successful client device authentication to the private network through the first network tunnel, to enable the client device to access the private network.

2. The system of claim 1, wherein the first and second tunnels are established using a challenge-response authentication protocol.

3. The system of claim 1, wherein the first and second tunnels are established using an Extensible Authentication Protocol (EAP).

4. The system of claim 3, wherein the Extensible Authentication Protocol is an Extensible Authentication Protocol-Transport Layer Security (EAP-TLS) protocol.

5. The system of claim 1, wherein the first and second tunnels are established based on user security credentials associated with the client device.

6. The system of claim 1, wherein data packets associated with the authentication of the client device with the private authentication server are encrypted.

7. The system of claim 6, wherein the encrypted data packets are forwarded unchanged by the public gateway to the private authentication server.

8. The system of claim 1, wherein the authentication of the client device with the private authentication server includes an exchange of a public-private key pair.

9. The system of claim 1, wherein the public network is a WiMAX wireless network.

10. The system of claim 1, wherein the first and second tunnels are IPsec tunnels.

11. The system of claim 1, wherein the first and second tunnels allow data to be securely exchanged between the client device and the private network.

12. A computer-implemented method for a client device to securely access a private network through a public wireless network, comprising:
   authenticating the client device with a public authentication server of the public wireless network;
   establishing a first network tunnel between the client device and a gateway of the public wireless network in response to a successful client device authentication to the public wireless network, wherein the public wireless network is connected to the private network;
   authenticating the client device with a private authentication server of the private network in response to a successful authentication of the client device to the public wireless network, wherein the private authentication server is coupled to a gateway of the private network and the client device authentication is proxied by the public authentication server of the public wireless network and is performed over the first network; and in response to a successful client device authentication to the private network through the first network tunnel, establishing a second network tunnel between the client device and the private network gateway to enable the client device to access the private network.

13. The method of claim 12, wherein the first and second tunnels are established using a challenge-response authentication protocol.

14. The method of claim 12, wherein the first and second tunnels are established using an Extensible Authentication Protocol (EAP).

15. The method of claim 14, wherein the Extensible Authentication Protocol is an Extensible Authentication Protocol-Transport Layer Security (EAP-TLS) protocol.

16. The method of claim 12, wherein the first and second tunnels are established based on user security credentials associated with the client device.

17. The method of claim 12, wherein data packets associated with the authentication of the client device with the private authentication server are encrypted.

18. The method of claim 17, wherein the encrypted data packets are forwarded unchanged by the public network gateway to the private authentication server.

19. The method of claim 12, wherein the authentication of the client device with the private authentication server includes an exchange of a public-private key pair.

20. The method of claim 12, wherein the public network is a WiMAX wireless network.

21. The method of claim 12, wherein the first and second tunnels are IPsec tunnels.

22. The method of claim 12, wherein the first and second tunnels allow data to be securely exchanged between the client device and the private network.

23. A computer program product for a client device to securely access a private network through a public wireless network, the product comprising a non-transitory computer usable storage medium having readable program code embodied in the non-transitory computer usable storage medium, the program code operable to:

authenticate the client device with a public authentication server of the public wireless network;

establish a first network tunnel between the client device and a gateway of the public wireless network in response to a successful client device authentication to the public wireless network, wherein the public wireless network is connected to the private network;

authenticate the client device with a private authentication server of the private network in response to a successful authentication of the client device to the public wireless network, wherein the private authentication server is coupled to a gateway of the private network and the client device authentication is proxied by the public authentication server of the public wireless network and is performed over the first network tunnel; and in response to a successful client device authentication to the private network through the first network tunnel, establish a second network tunnel between the client device and the private network gateway to enable the client device to access the private network.

* * * * *